United States Patent
Kim (10) Patent No.: US 10,523,452 B2
(45) Date of Patent: Dec. 31, 2019

(54) NODE UNIT INCLUDING QUEUING ENGINE FOR MULTICASTING ETHERNET DATA AND DISTRIBUTED ANTENNA SYSTEM INCLUDING THE SAME

(71) Applicant: SOLiD, INC., Seongnam-si, Gyeonggi-do (KR)

(72) Inventor: Doyoon Kim, Bucheon-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/540,638

(22) PCT Filed: Dec. 30, 2015

(86) PCT No.: PCT/KR2015/014514
§ 371 (c)(1),
(2) Date: Sep. 14, 2017

(87) PCT Pub. No.: WO2016/108640
PCT Pub. Date: Jul. 7, 2016

(65) Prior Publication Data
US 2018/0034649 A1 Feb. 1, 2018

(30) Foreign Application Priority Data

Dec. 30, 2014 (KR) .................. 10-2014-0194360
Feb. 24, 2015 (KR) .................. 10-2015-0026054

(51) Int. Cl.
*H04L 12/18* (2006.01)
*H04L 12/861* (2013.01)

(52) U.S. Cl.
CPC .............. *H04L 12/18* (2013.01); *H04L 49/90* (2013.01)

(58) Field of Classification Search
None
See application file for complete search history.

(56) References Cited

U.S. PATENT DOCUMENTS 8,976,067 B2 3/2015 Fischer
2009/0318089 A1* 12/2009 Stratford ............ H04W 88/085
455/67.11

(Continued)

FOREIGN PATENT DOCUMENTS

KR 10-2014-0045444 A 4/2014

OTHER PUBLICATIONS

International Search Report of PCT/KR2015/014514, dated May 4, 2016. [PCT/ISA/210].

*Primary Examiner* — Hassan A Phillips
*Assistant Examiner* — Gautam Sharma
(74) *Attorney, Agent, or Firm* — Sughrue Mion, PLLC (57) ABSTRACT

Provided are a node unit including a queuing engine for multicasting Ethernet data, and a distributed antenna system including the same. The node unit is a node unit which is branch-connected to a plurality of lower nodes, and comprises: a media access control (MAC) module; and a queuing engine for interfacing Ethernet data between the MAC module and the plurality of branch-connected lower nodes, wherein the queuing engine multicasts Ethernet data received from the MAC module to the plurality of branch-connected lower nodes, transfers Ethernet data received from the plurality of branch-connected lower nodes to the MAC module, wherein the queuing engine comprises a buffer for buffering Ethernet data received from the plurality of branch-connected lower nodes, and outputting the buffered Ethernet data to the MAC module.

18 Claims, 4 Drawing Sheets

(56) References Cited

U.S. PATENT DOCUMENTS

| | | | |
|---|---|---|---|
| 2012/0057572 A1 | 3/2012 | Evans et al. | |
| 2012/0313821 A1* | 12/2012 | Fischer | H01Q 9/0407 |
| | | | 343/700 MS |
| 2013/0308469 A1* | 11/2013 | Lightstone | H04W 28/0252 |
| | | | 370/252 |
| 2014/0064730 A1* | 3/2014 | Ko | H04B 10/2575 |
| | | | 398/67 |
| 2014/0119281 A1 | 5/2014 | Kummetz et al. | |
| 2014/0314002 A1 | 10/2014 | Hanson et al. | |
| 2016/0037550 A1* | 2/2016 | Barabell | H04B 17/318 |
| | | | 455/450 |
| 2016/0105861 A1* | 4/2016 | Martinez | H04W 56/005 |
| | | | 370/210 |

* cited by examiner

NODE UNIT INCLUDING QUEUING ENGINE FOR MULTICASTING ETHERNET DATA AND DISTRIBUTED ANTENNA SYSTEM INCLUDING THE SAME

CROSS-REFERENCE TO RELATED APPLICATIONS

This application is a National Stage of International Application No. PCT/KR2015/014514, filed Dec. 30, 2015, and claims priority from Korean Patent Application No. 10-2014-0194360, filed Dec. 30, 2014, and Korean Patent Application No. 10-2015-0026054, filed Feb. 24, 2015, the contents of which are incorporated herein by reference in their entireties.

BACKGROUND

1. Field

The present invention relates to a distributed antenna system, and more particularly, to a node unit including a queuing engine for multicasting Ethernet data, and a distributed antenna system including the same.

2. Description of the Related Art

A distributed antenna system mainly performs a function of relaying macro wireless base station signals of a mobile communication service provider. However, recently, the distributed antenna system uses an Ethernet protocol while supporting the function of a backhaul transmission network capable of accommodating a long term evolution (LTE)/3 generation (3G) small cell and wireless fidelity (WIFI) as one of additional functions. Also, the distributed antenna system having high system complexity uses an Ethernet protocol having high throughput and high reliability as an interface of a control & management (C&M) channel. In this way, the use of Ethernet in the distributed antenna system has been gradually generalized.

The distributed antenna system provides an Ethernet interface between a master unit and several tens of remote units, and between cascade-connected remote units and controls a path of Ethernet data using a device, such as a layer 2 switch disposed outside a field programmable gate array (FPGA).

However, even when clock and control signals are excluded from the Ethernet interface with several tens of links, in case of media independent interface (MII), assignment of 10 pins is required, and in case of gigabit MII (GMII), assignment of 18 pins is required. Thus, it is difficult to implement the Ethernet interface with hardware.

SUMMARY

The present invention is directed to providing a node unit including a queuing engine for multicasting Ethernet data in which an Ethernet interface is efficiently provided into a distributed antenna system and hardware simplification of a digital board is feasible, and a distributed antenna system including the node unit.

According to an aspect of the present invention, there is provided a node unit, connected to a plurality of lower nodes, includes a media access control (MAC) module; and a queuing engine for interfacing Ethernet data between the MAC module and the plurality of lower nodes, wherein the queuing engine multicasts Ethernet data received from the MAC module to the plurality of lower nodes, transfers Ethernet data received from the plurality of lower nodes to the MAC module, and wherein the queuing engine comprises a buffer for buffering Ethernet data received from the plurality of lower nodes, and outputting the buffered Ethernet data to the MAC module.

According to an embodiment, the queuing engine may be implemented within a field programmable gate array (FPGA) that constitutes a digital part of the node unit.

According to an embodiment, the buffer may be a first-in first-out (FIFO) buffer.

According to an embodiment, the FIFO buffer may have a size of twice or more a full frame length of the Ethernet data.

According to an embodiment, the Ethernet data may be control/management signals transmitted from an external management device connected to the node unit or transmitted to the external management device.

According to an embodiment, the queuing engine may further include a signal control logic for determining that Ethernet data received from the MAC module is effective when a signal TX_EN is at a first level and for dropping non-effective Ethernet data.

According to an embodiment, the queuing engine may further include a signal control logic for determining that Ethernet data received from the plurality of lower nodes is effective when a signal RX_DV is at a first level and for dropping non-effective Ethernet data.

According to an embodiment, the queuing engine may further include a scheduler for determining whether the Ethernet data is effective when the Ethernet data is input from the buffer, and for outputting the Ethernet data determined to be effective to the MAC module.

According to an embodiment, the scheduler may determine that the Ethernet data received from the MAC module is effective when the signal TX_EN is at a first level, and drop non-effective Ethernet data.

According to an embodiment, the scheduler the queuing engine may determine that the Ethernet data received from the plurality of lower nodes is effective when the signal RX_DV is at a first level, and drop non-effective Ethernet data.

According to another aspect of the present invention, there is provide a node unit, cascade-connected to an upper node and a lower node, includes a media access control (MAC) module; and a queuing engine for interfacing Ethernet data between the MAC module, the upper node and the lower node, wherein the queuing engine multicasts Ethernet data received from the upper node to the MAC module and the lower node, multicasts Ethernet data received from the lower node to the MAC module and the upper node, multicasts Ethernet data received from the MAC module to the upper node and the lower node, wherein the queuing engine includes a first buffer for buffering Ethernet data received from the upper node or the lower node, and outputting the buffered Ethernet data to the MAC module; a second buffer for buffering Ethernet data received from the upper node or the MAC module, and outputting the buffered Ethernet data to the lower node; and a third buffer for buffering Ethernet data received from the lower node or the MAC module, and outputting the buffered Ethernet data to the upper node.

According to an embodiment, the queuing engine may be implemented within a field programmable gate array (FPGA) that constitutes a digital part of the node unit.

According to an embodiment, the buffer may be a first-in first-out (FIFO) buffer.

According to an embodiment, the FIFO buffer may have a size of twice or more a full frame length of the Ethernet data.

According to an embodiment, the Ethernet data may be control/management signals transmitted from an external management device connected to the node unit or transmitted to the external management device.

According to an embodiment, the queuing engine may further include a first scheduler for determining that the Ethernet data input from the first buffer is effective, and outputting the Ethernet data determined to be effective to the MAC module.

According to an embodiment, the queuing engine may further include a second scheduler for determining that the Ethernet data input from the second buffer is effective, and outputting the Ethernet data determined to be effective to the lower node.

According to an embodiment, the queuing engine may further include a third scheduler for determining whether the Ethernet data input from the third buffer is effective, and outputting the Ethernet data determined to be effective to the upper node.

According to still another aspect of the present invention, there is provided a distributed antenna system includes a master unit; and a plurality of remote units connected to the master unit, wherein at least a part of the plurality of remote units comprises a remote unit cascade-connected to an upper remote unit and a lower remote unit, and wherein the master unit comprises a master unit media access control (MAC) module and a master unit queuing engine for interfacing Ethernet data between the master unit MAC module and the plurality of remote units, and wherein the master unit queuing engine multicasts Ethernet data received from the master unit MAC module to the plurality of remote units, transfers Ethernet data received from the plurality of remote units to the master unit MAC module, wherein the master unit queuing engine comprises a buffer for buffering Ethernet data received from the plurality of remote units, and outputting the buffered Ethernet data to the master unit MAC module, and wherein the cascade-connected remote unit comprises a remote unit MAC module and a remote unit queuing engine for interfacing Ethernet data between the remote unit MAC module, the upper remote unit and the lower remote unit, and wherein the remote unit queuing engine multicasts Ethernet data received from the upper remote unit to the remote unit MAC module and the lower remote unit, multicasts Ethernet data received from the lower remote unit to the remote unit MAC module and the upper remote unit, multicasts Ethernet data received from the remote unit MAC module to the upper remote unit and the lower node remote unit, wherein the remote unit queuing engine includes a first buffer for buffering Ethernet data received from the upper remote unit or the lower remote unit, and outputting the buffered Ethernet data to the remote unit MAC module; a second buffer for buffering Ethernet data received from the upper remote unit or the remote unit MAC module, and outputting the buffered Ethernet data to the lower remote unit; and a third buffer for buffering Ethernet data received from the lower remote unit or the remote unit MAC module, and outputting the buffered Ethernet data to the upper remote unit.

According to an embodiment of the present invention, because a queuing engine for multicasting Ethernet data without referring to a destination address field is used, an Ethernet interface can be efficiently provided into a distributed antenna system, and effects of hardware simplification of a digital board and cost reduction caused by non-usage of an external device, such as a layer 2 switch, can be achieved.

DETAILED DESCRIPTION OF EXEMPLARY EMBODIMENTS

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the inventive concept and technical scope of the present invention are encompassed in the present invention.

In the description of the present invention, certain detailed explanations of related art are omitted when it is deemed that they may unnecessarily obscure the essence of the invention. In addition, numbers (for example, first, second, etc.) used during describing of the present specification are just identification symbols for distinguishing one component from another.

In addition, it will be understood that when an element is referred to as being "connected to" or "coupled to" another element, the element can be directly connected to or directly coupled to another element or intervening elements, unless specially otherwise defined.

Hereinafter, embodiments of the present invention will be described in detail with reference to the attached drawings.

Hereinafter, a distributed antenna system will be described as an application example to which embodiments of the present invention may be applied. However, the embodiments of the present invention may be applied to another signal distributed transmission system, such as a base station distributed system, in the same or similar way in addition to the distributed antenna system.

Figure 1:
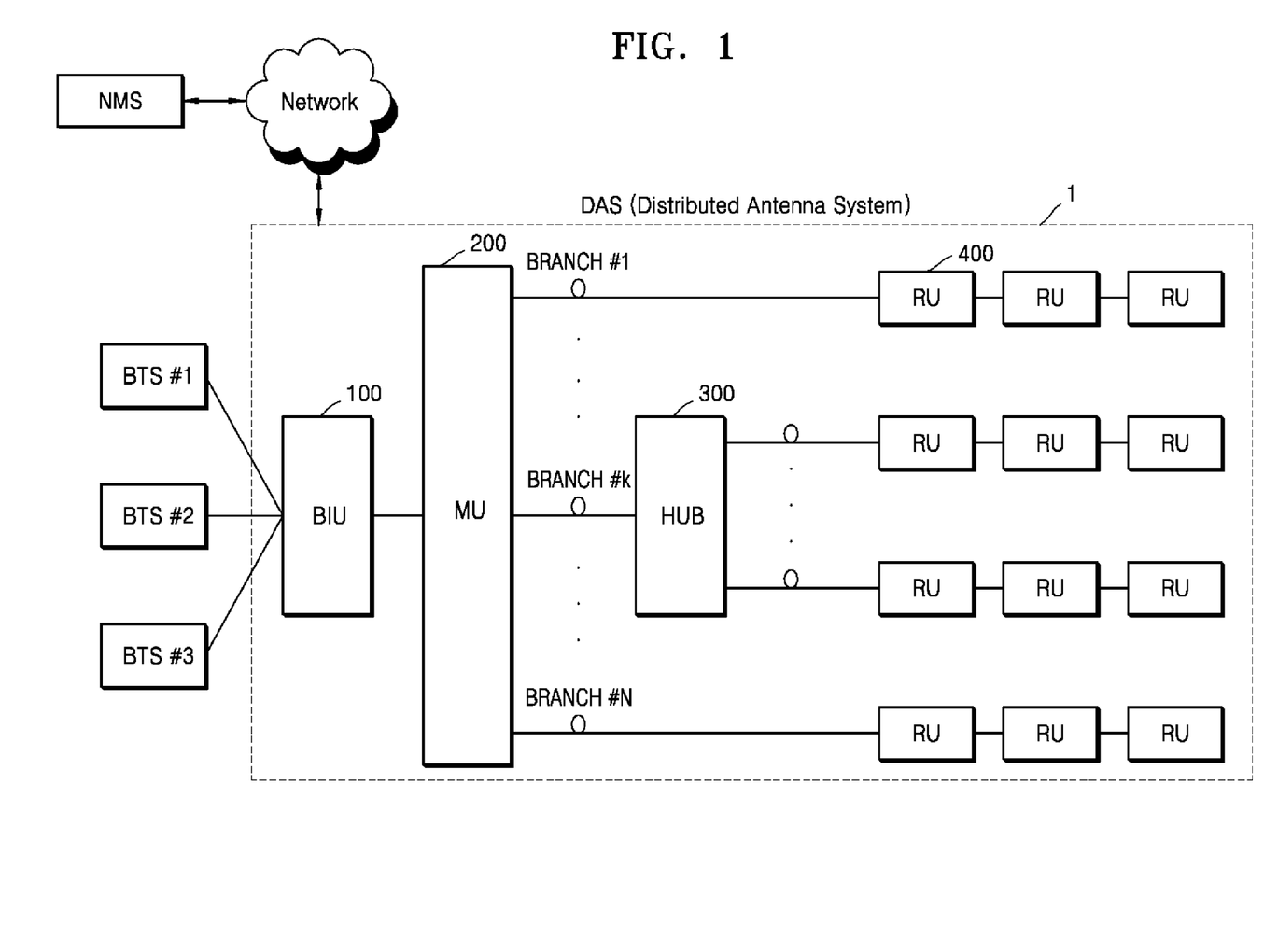
FIG. 1 is a view of an example of topology of a distributed antenna system as one embodiment of a signal distributed transmission system to which the present invention may be applied.

FIG. 1 is a view of an example of topology of a distributed antenna system as one embodiment of a signal distributed transmission system to which the present invention may be applied.

Referring to FIG. 1, a distributed antenna system (DAS) 1 includes a base station interface unit (BIU) 100 and a main unit (MU) 200 that constitute a headend node of the DAS 1, a hub unit (HUB) 300 that is an extension node, and a plurality of remote units (RUs) 400 disposed in remote service locations.

The DAS 1 may be implemented with an analog DAS or digital DAS. In some cases, the DAS 1 may also be implemented with a mixed shape thereof (in other words, a part of nodes performs analog processing, and the other nodes perform digital processing).

FIG. 1 is a view of an example of topology of the DAS 1, and topology of the DAS 1 may be modified in various ways in consideration of distinct characteristics of an installation region and an applied field (for example, an in-building, a subway, a hospital, a stadium, etc.). In such a purpose, the number of BIUs 100, MUs 200, HUB s 300, and RUs 400 and a connection relationship between upper and lower stages therebetween may be different from those of FIG. 1.

Also, in the DAS 1, the HUB 300 is utilized when the number of branches to be branched in a star structure from the MU 200 is limited compared to the number of RUs 40 required to be installed. Thus, when the number of RUs 400 required to be installed is sufficient only using a single MU 200 or a plurality of MUs 200 are installed, the HUB 300 may also be omitted from the DAS 1.

Hereinafter, nodes in the DAS 1 that may be applied to the present invention, and functions thereof will be sequentially described based on topology of FIG. 1.

The BIU 100 functions as an interface between a base station transceiver system (BTS), such as a base station, and the MU 200 within the DAS. Although FIG. 1 illustrates the case where a plurality of BTSs are connected to a single BIU 100, the BIU 100 may also be separately provided according to a business provider, a frequency band, or a sector.

In general, since radio frequency (RF) signals transmitted from the BTS are signals with high power, the BIU 100 performs a function of converting the RF signals with high power into signals with appropriate power to be processed by the MU 200 and transmitting the converted signals with appropriate power to the MU 200.

Also, the BIU 100 may perform a function of receiving signals of a mobile communication service according to a frequency band (or a business provider, a sector), combining the received signals and then transmitting the combined signals to the MU 200, as illustrated in FIG. 1, according to an implementation method.

When the BIU 100 reduces the high-power signals of the BTS into low-power signals and then combines mobile communication service signals and transmits the combined signals to the MU 200, the MU 200 performs a function of distributing the combined and transmitted mobile communication service signals (hereinafter, referred to as relay signals) according to branches. In this case, when the DAS 1 is implemented with a digital DAS, the BIU 100 may include a unit for converting the high-power RF signals of the BTS into low-power RF signals, and a unit for converting the low-power RF signals into Intermediate frequency (IF) signals, performing digital signal processing on the IF signals and then combining them. Unlike this, if the BIU 100 performs only a function of reducing the high-power signals of the BTS into low-power signals, the MU 200 may perform a function of combining the transmitted relay signals and distributing them according to branches. A detailed function configuration of the master unit 200 will be described in detail with reference to FIG. 2 below.

As described above, the combined relay signals distributed from the MU 200 are transmitted to the RUs 400 via the HUB 300 or are transmitted directly to the RUs 400 according to branches (see Branch #1, . . . Branch #k, . . . and Branch #N of FIG. 1).

Each of the RUs 400 separates the transmitted and combined relay signals according to frequency bands and performs signal processing (in case of an analog DAS, analog signal processing, and in case of a digital DAS, digital signal processing) on the relay signals.

Thus, each RU 400 transmits the relay signals to a user terminal in its own service coverage via a service antenna. In this case, a specific function configuration of each RU 400 will be described in detail with reference to FIG. 4 below.

In FIG. 1, the BTS and the BIU 100, and the BIU 100 and the MU 200 are respectively connected to each other via a RF cable, and from the MU 200 to a lower stage thereof is connected to each other via an optical cable. However, a signal transport medium between nodes may be modified in various ways. In an example, the BIU 100 and the MU 200 may be connected to each other via the RF cable or may also be connected to each other via the optical cable or the digital interface. In another example, the MU 200 and the HUB 300, and the RUs 400 directly connected to the MU 200 are connected to each other via the optical cable, and the RUs 400 that are cascade-connected to each other may be connected via the RF cable, a twist cable, or an unshielded twisted pair (UTP) cable. In another example, the RUs 400 directly connected to the MU 200 may be connected via the RF cable, the twist cable, or the UTP cable.

However, hereinafter, this will be described based on FIG. 1. Thus, in the current embodiment, all of the MU 200, the HUB 300, and the RU 400 may include an optical transceiver module for electrical-to-optical/optical-to-electrical conversion, and when nodes are connected via a single optical cable, all of the MU 200, the HUB 300, and the RU 400 may include a wavelength division multiplexing (WDM) element.

The DAS 1 may be connected to an external management device (a network management server or system (NMS) of FIG. 1) via a network. Thus, a manager may monitor a state and a problem of each node of the DAS 1 in a remote manner via the NMS and may control an operation of each node in the remote manner. In this case, control/management signals for controlling an operation of each node may use an Ethernet protocol having high throughput and high reliability. Also, the DAS 1 may use an Ethernet protocol while supporting a function of a backhaul transmission network capable of accommodating a long term evolution (LTE)/3 generation (3G) small cell and wireless fidelity (WiFi), in addition to a function of relaying wireless base station signals of a mobile communication service provider.

Figure 2:
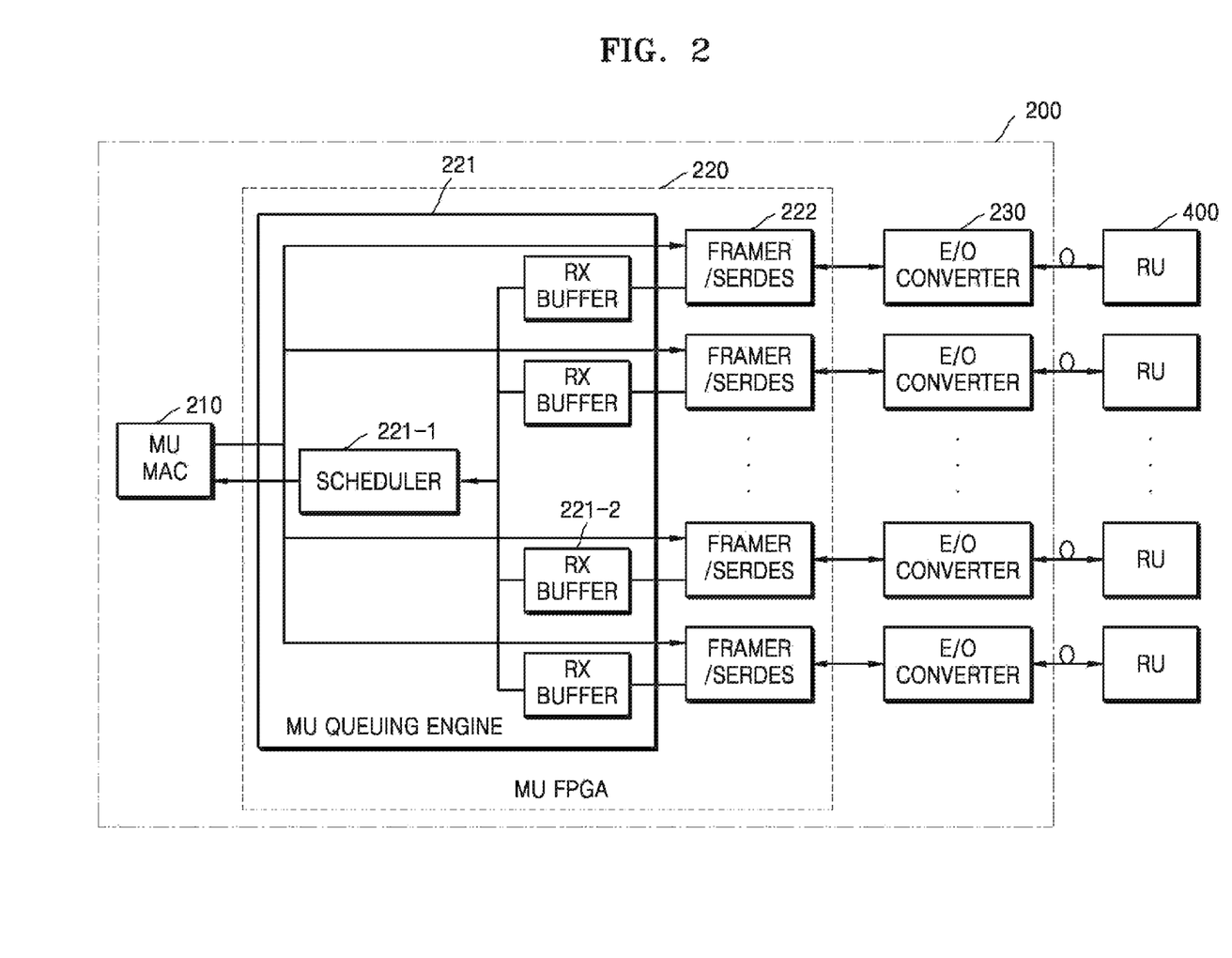
FIG. 2 is a block diagram of a master unit within the distributed antenna system to which the present invention may be applied, according to an embodiment.

FIG. 2 is a block diagram of a master unit within the distributed antenna system to which the present invention may be applied, according to an embodiment.

The block diagram of FIG. 2 illustrates an embodiment of the MU 200 within a digital DAS in which connection between nodes is implemented via an optical cable.

A queuing engine for Ethernet data transmission according to an embodiment of the present invention is applied to the MU 200 of FIG. 2. The queuing engine according to the embodiment of the present invention may be implemented within a digital part of the MU 200. When a field programmable gate array (FPGA) is applied so as to configure the digital part of the MU 200, the queuing engine may be implemented within the FPGA.

Referring to FIG. 2, the MU 200 includes a media access control (MAC) module 210, an FPGA 220 that constitutes the digital part, and a plurality of electrical-optical (E/O) converters 230.

The MAC module 210 performs a function of addressing and channel access control.

The FPGA 220 includes a queuing engine 221, and a plurality of framer and serializer/deserializers (SERDESs) 222 connected to the queuing engine 221. The queuing engine 221 performs a function of interfacing Ethernet data between the MAC module 210 and the plurality of framer/

SERDESs 222. The plurality of framer/SERDESs 222 may be configured to correspond to the plurality of RUs 400 that constitute lower nodes of the MU 200. That is, the plurality of framers/SERDESs 222 may be present according to branches (see FIG. 1).

When the Ethernet data is received from the MAC module 210, the queuing engine 221 multicasts the Ethernet data received from the MAC module 210 to the plurality of framer/SERDESs 222 (without referring to a destination address field by decoding the Ethernet data). The framer/SERDESs 222 formats the Ethernet data received from the queuing engine 221 in a suitable format for digital transmission and converts parallel digital signals into serial digital signals. The E/O converters 230 convert the digital signals received from the framer/SERDESs 222 into optical signals and transmit the optical signals to the RUs 400 via an optical cable.

Thus, the Ethernet data received from the MAC module 210 of the MU 200 is multicasted to the plurality of RUs 400 that constitute lower nodes. However, each of the RUs 400 does not accommodate the Ethernet data if a destination address of the Ethernet data is not the RU 400 so that throughput is not lowered.

When the Ethernet data is received from the RUs 400 that are lower nodes, each of the E/O converters 230 converts the optical signals received from the RUs 400 via the optical cable into digital signals and transmits the digital signals to the framer/SERDESs 222. The framer/SERDESs 222 convert serial digital signals into parallel digital signals and reformat the parallel digital signals in a suitable format for processing according to frequency bands. The queuing engine 221 transmits the Ethernet data received from each of the framer/SERDESs 222 to the MAC module 210.

Because each of the RUs 400 transmits the Ethernet data to an upper node if it responds to a request of the MU 200 or alarm information is present when an abnormality occurs, there is no need for guaranteeing an exclusive link for transmitting the Ethernet data between each of the framer/SERDESs 222 (corresponding to each RU 400) and the MAC module 210.

The queuing engine 221 may include elements for determining effectiveness of data received from the framer/SERDESs 222 and outputting the effective data to the MAC module 210 in order when a link for transmitting the Ethernet data between the framer/SERDESs 222 and the MAC module 210 is already being occupied. The queuing engine 221 may include at least one receiving buffer 221-2 and scheduler 221-1. The receiving buffer 221-2 may input the Ethernet data received from the RUs 400 of the lower nodes into the scheduler 221-1. The scheduler 221-1 may determine effectiveness of the data received from the at least one receiving buffer 221-2 and may output the effective data to the MAC module 210. An operation of determining effectiveness of the data received by the scheduler 221-1 will be described later with reference to FIG. 3. The scheduler 221-1 may include a First-In First-Out (FIFO) buffer and output the data received from the receiving buffer 221-2 in an input order to the MAC module 210. However, embodiments of the present invention are not limited thereto.

Meanwhile, when a link between the queuing engine 221 and the MAC module 210 is already being occupied, the buffer included in the scheduler 221-1 is full and a storage space of the buffer is insufficient, the Ethernet data may be lost and thus, the receiving buffer 221-2 may also be configured of an FIFO buffer. For example, the receiving buffer 221-2 may be configured of an FIFO buffer having a sufficient size of twice or more a full frame length of the Ethernet data. Also, even when the Ethernet data is lost, due to transmission characteristics of best effort of an Ethernet protocol, the Ethernet data is retransmitted through random backoff so that the receiving buffer 221-2 may also be configured of an FIFO buffer having an appropriate size according to required throughput.

FIG. 2 illustrates the case where a framer and a SERDES are configured of a single unit. However, a framer and a SERDES may also be separately configured of each unit as necessary.

Figure 3:
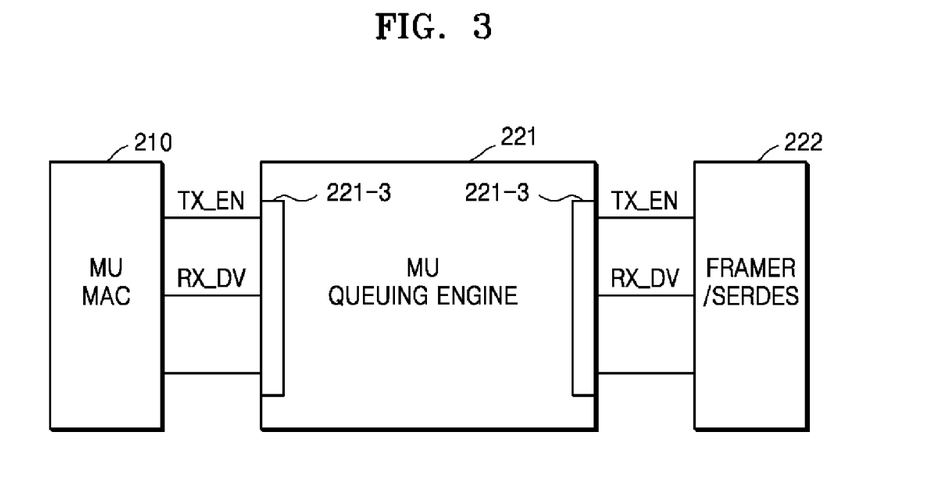
FIG. 3 is a block diagram of a modified example in which a signal control logic is additionally applied to the master unit of FIG. 2.

FIG. 3 is a block diagram of a modified example in which a signal control logic is additionally applied to the MU of FIG. 2.

Referring to FIG. 3, the queuing engine 221 may include a signal control logic 221-3. The signal control logic 221-3 may be an element separately provided in the queuing engine 221 or an element implemented within the scheduler 221-1 illustrated in FIG. 2. The signal control logic 221-3 may determine whether the Ethernet data received from the MAC module 210 or the framer/SERDESs 222 is effective data, and when it is determined that the Ethernet data received from the MAC module 210 or the framer/SERDESs 222 is effective data, the signal control logic 221-3 may multicast the Ethernet data to the framer/SERDESs 222 or may transmit the Ethernet data to the MAC module 210. The signal control logic 221-3 may determine that the Ethernet data received from the MAC module 210 or the framer/SERDESs 222 is effective Ethernet data only when a transmit enable signal TX_EN from the MAC module 210 is at a first level (for example, high) and/or a receive data valid signal RX_DV from the framer/SERDESs 222 is at a first level. When the Ethernet data received from the MAC module 210 or the framer/SERDESs 222 is not effective Ethernet data, the signal control logic 221-3 drops the received Ethernet data and does not multicast the received Ethernet data to the framer/SERDESs 222 of a next stage or does not transmit the received Ethernet data to the MAC module 210.

FIG. 3 illustrates the case where the signal control logic 221-3 is configured at a transmitting terminal and a receiving terminal of the queuing engine 221, respectively. However, the signal control logic 221-3 may also be configured of a single logic connected to the transmitting end and the receiving end of the queuing engine 221 as necessary. Also, the control logic 221-3 may also be configured in the scheduler 221-1, as described above.

Figure 4:
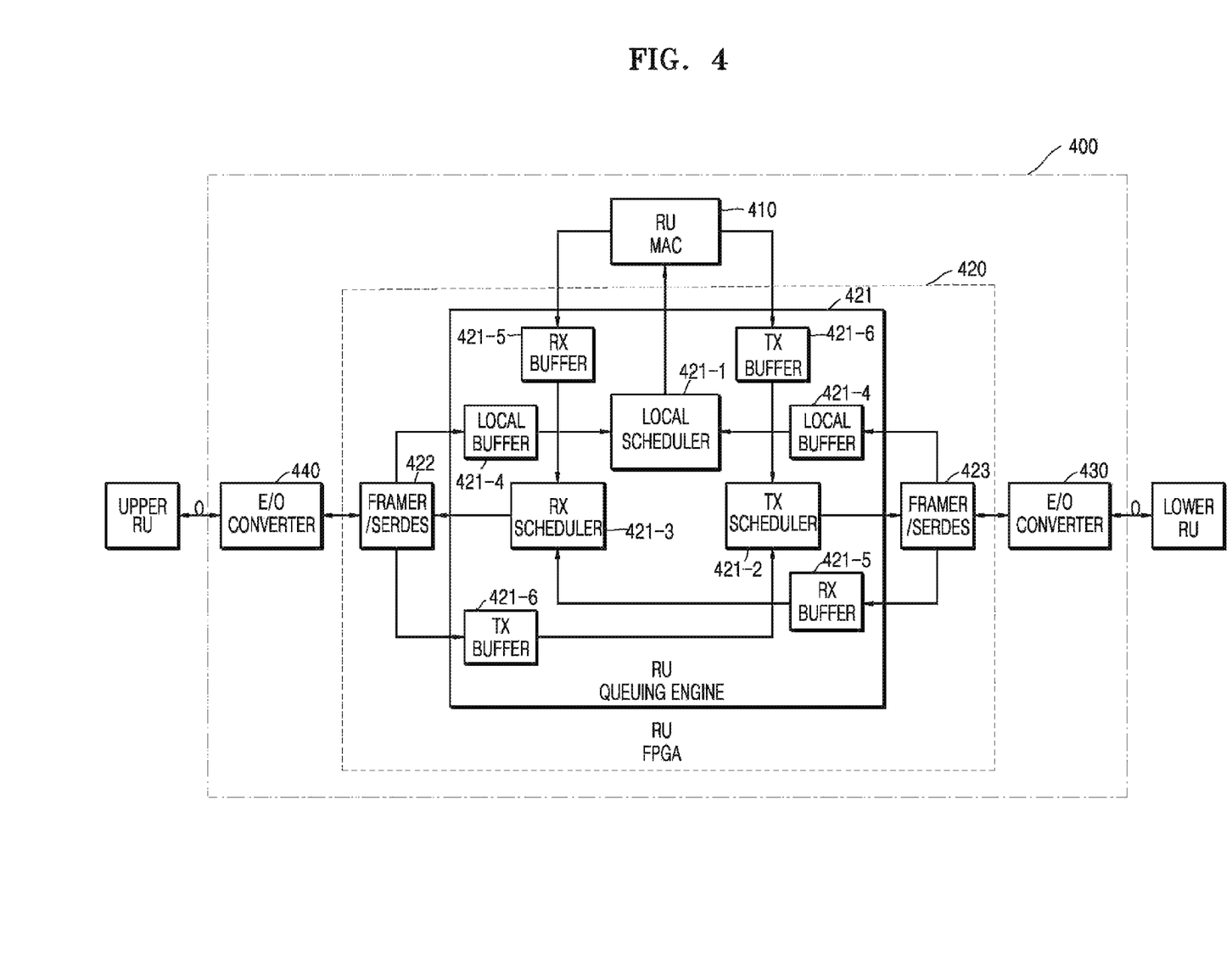
FIG. 4 is a block diagram of a remote unit within the distributed antenna system to which the present invention may be applied, according to an embodiment.

FIG. 4 is a block diagram of an RU within a distributed antenna system to which the present invention may be applied.

The block diagram of FIG. 4 illustrates an embodiment of each RU 400 in a digital DAS in which connection between nodes is implemented via an optical cable. In particular, the block diagram of FIG. 4 illustrates the RU 400 cascade-connected to an RU of an upper stage and an RU of a lower stage.

A queuing engine for Ethernet data transmission according to an embodiment of the present invention is applied to the RU 400 of FIG. 4. The queuing engine applied to the RU 400 of a middle stage of FIG. 4 may also be applied to the RU of the upper stage and/or the RU of the lower stage.

The queuing engine according to an embodiment of the present invention may be implemented within a digital part of the RU 400. When an FPGA is applied so as to configure the digital part of the RU 400, the queuing engine may be implemented within the FPGA.

Referring to FIG. 4, the RU 400 includes a MAC module 410, an FPGA 420 that constitutes the digital part of the RU 400, and a plurality of E/O converters 430 and 440. Reference numerals 430 and 440 are used to classify an E/O converter connected to an upper RU and an E/O converter connected to a lower RU from each other.

The MAC module 410 performs a function of addressing and channel access control.

The FPGA 420 includes a queuing engine 421, and a plurality of framer/SERDESs 422 and 423 connected to the queuing engine 421. The queuing engine 421 performs a function of interfacing the Ethernet data between the MAC module 410 and the plurality of framer/SERDESs 422 and 423. The framer/SERDES 422 may correspond to an upper RU that constitutes an upper node of the RU 400, and the framer/SERDES 423 may correspond to a lower RU that constitutes a lower node of the RU 400.

When receiving the Ethernet data from the RU of the upper node, the E/O converter 440 converts optical signals received from the RU of the upper node via an optical cable into digital signals and transmits the digital signals to the framer/SERDES 422. The framer/SERDES 422 converts serial digital signals into parallel digital signals and reformats the parallel digital signals in a suitable format for processing according to frequency bands.

The queuing engine 421 multicasts the Ethernet data received from the framer/SERDESs 422 to the MAC module 410 and the RU of the lower node.

The framer/SERDES 423 formats the Ethernet data received from the queuing engine 421 in a suitable format for digital transmission and converts parallel digital signals into serial digital signals. The E/O converter 430 converts the digital signals received from the framer/SERDES 423 into optical signals and transmits the optical signals to the RU of the lower node via the optical cable.

When the Ethernet data is received from the RU of the lower node, the E/O converter 430 converts the optical signals received from the RU of the lower node via the optical cable into digital signals and transmits the digital signals to the framer/SERDES 423. The framer/SERDES 423 converts serial digital signals into parallel digital signals and reformats the parallel digital signals in a suitable format for processing according to frequency bands.

The queuing engine 421 multicasts the Ethernet data received from the framer/SERDES 423 to the MAC module 410 and the RU of the upper node.

The framer/SERDES 422 formats the Ethernet data received from the queuing engine 421 in a suitable format for digital transmission and converts parallel digital signals into serial digital signals. The E/O converter 440 converts the digital signals received from the framer/SERDES 422 into optical signals and transmits the optical signals to the RU of the upper node via the optical cable.

When receiving the Ethernet data from the MAC module 410, the queuing engine 421 multicasts the received Ethernet data to the RU of the upper node and/or the RU of the lower node.

The framer/SERDES 422 formats the Ethernet data received from the queuing engine 421 in a suitable format for digital transmission and converts parallel digital signals into serial digital signals. The E/O converter 440 converts the digital signals received from the framer/SERDES 422 into optical signals and transmits the optical signals to the RU of the upper node via the optical cable.

The framer/SERDES 423 formats the Ethernet data received from the queuing engine 421 in a suitable format for digital transmission and converts parallel digital signals into serial digital signals. The E/O converter 430 converts the digital signals received from the framer/SERDES 423 into optical signals and transmits the optical signals to the RU of the lower node via the optical cable.

When a link for transmitting the Ethernet data between the MAC module 410 and the plurality of framer/SERDESs 422 and 423 is already being occupied, the queuing engine 421 may include elements for determining effectiveness of the data received from the framer/SERDESs 422 and 423 and outputting the effective data to the MAC module 410 in order. The queuing engine 421 may include schedulers 421-1, 421-2, and 421-3, a local buffer 421-4, a receiving buffer 421-5, and a transmitting buffer 421-6. The schedulers 421-1, 421-2, and 421-3 may include a local scheduler 421-1, a transmitting scheduler (TX scheduler) 421-2, and a receiving scheduler (RX scheduler) 421-3 according to a direction of a link.

The schedulers 421-1, 421-2, and 421-3 may determine effectiveness of data received from at least one connected buffer 421-4, 421-5 and/or 421-6 and may output effective data. For example, the local scheduler 421-1 may determine effectiveness of data received from the local buffer 421-4 and may output the effective data to the MAC module 410. Similarly, the transmitting scheduler 421-2 may determine effectiveness of data received from the transmitting buffer 421-6 and may output the effective data to the framer/SERDES 423. An operation of determining effectiveness of data received by the schedulers 421-1, 421-2, and 421-3 is the same as or similar to the operation described with reference to FIG. 3 and thus, detailed descriptions thereof will be omitted. The schedulers 421-1, 421-2, and 421-3 may output data received from at least one connected buffer 421-4, 421-5 and/or 421-6 to the MAC module 210 in an input order by including an FIFO buffer. However, embodiments of the present invention are not limited thereto.

Also, the local buffer 421-4, the receiving buffer 421-5 and/or the transmitting buffer 421-6 may be FIFOs. However, embodiments of the present invention are not limited thereto. Similarly to the scheduler 221-1 and the receiving buffer 221-2 of the MU 200 described with reference to FIG. 2, elements 421-1, 421-2, 421-3, 421-4, 421-5, and 421-6 of the queuing engine 421 may include a plurality of FIFO buffers or an FIFO buffer having a sufficient size so as to loss of the Ethernet data.

For conveniences of understanding, the local scheduler 421-1 will now be described. The local buffer 421-4 may output the Ethernet data received from the connected upper and/or lower RU to the local scheduler 421-1, and the local scheduler 421-1 may output the received Ethernet data to the MAC module 410. In this case, the local scheduler 421-1 and/or the local buffer 421-4 may be configured of FIFO buffers. However, embodiments of the present invention are not limited thereto. Similarly, the transmitting buffer 421-6 may output the Ethernet data received from the connected upper node and/or the MAC module 410, and the transmitting scheduler 421-2 may output the received Ethernet data to the lower nodes. Also, the receiving buffer 421-5 may output the Ethernet data received from the connected lower nodes and/or the MAC module 410 to the receiving scheduler 421-3, and the receiving scheduler 421-3 may output the received Ethernet data to the upper node.

Also, a buffer included in each of the elements 421-1, 421-2, 421-3, 421-4, 421-5, and 421-6 may include an FIFO buffer having an appropriate size according to a required throughput.

The queuing engine 421 may input the Ethernet data received from the RU of the upper node into the local scheduler 421-1 and/or the transmitting scheduler 421-2. In this case, the Ethernet data received from the RU of the upper node may be input into the local scheduler 421-1 via the local buffer 421-4 and may be input into the transmitting scheduler 421-2 via the transmitting buffer 421-6. The local buffer 421-4 may output the input Ethernet data sequentially and may transmit the output Ethernet data to the local scheduler 421-1.

The queuing engine 421 may input the Ethernet data received from the RU of the lower node to the local scheduler 421-1 and/or the receiving scheduler 421-3. In this case, the Ethernet data received from the RU of the lower node may be input into the local scheduler 421-1 via the local buffer 421-4 and may be input into the receiving scheduler 421-3 via the receiving buffer 421-5. The transmitting buffer 421-6 may output the input Ethernet data sequentially and may transmit the output Ethernet data to the transmitting scheduler 421-2.

The queuing engine 421 may input the Ethernet data received from the MAC module 410 into the transmitting scheduler 421-2 and/or the receiving scheduler 421-3. In this case, the Ethernet data received from the MAC module 410 may be input into the receiving scheduler 421-3 via the receiving buffer 421-5 and may be input into the transmitting scheduler 421-2 via the transmitting buffer 421-6. The receiving buffer 421-5 may output the input Ethernet data sequentially and may transmit the output Ethernet data to the receiving scheduler 421-3.

When the Ethernet data is input into the local scheduler 421-1, the local scheduler 421-1 may determine effectiveness of the Ethernet data, may output the effective data sequentially and may transmit the output data to the MAC module 410. When the Ethernet data is input into the transmitting scheduler 421-2, the transmitting scheduler 421-2 may determine effectiveness of data, may output the effective data sequentially and may transmit the output data to the framer/SERDES 423 corresponding to the RU of the lower node. When the Ethernet data is input into the receiving scheduler 421-3, the receiving scheduler 421-3 may determine effectiveness of the data, may output the effective data sequentially and may transmit the output data to the framer/SERDES 422 corresponding to the RU of the upper node.

As described above, the queuing engine 421 of the RU 400 may include a first element (the local scheduler 421-1 and the local buffer 421-4) for buffering the Ethernet data received from the upper node or the lower node and outputting the buffered Ethernet data to the MAC module 400. Also, the queuing engine 421 of the RU 400 may include a second element (the transmitting scheduler 421-2 and the transmitting buffer 421-6) for buffering the Ethernet data received from the upper node or the MAC module 400 and outputting the buffered Ethernet data to the lower node. Also, the queuing engine 421 of the RU 400 may include a third element (the receiving scheduler 421-3 and the receiving buffer 421-5) for buffering the Ethernet data received from the sub-node or the MAC module 400 and outputting the buffered Ethernet data to the lower node.

In FIG. 4, a framer and a SERDES are configured of a single unit. However, a framer and a SERDES may be separately configured of each unit as necessary.

The RU 400 of FIG. 4 may further include elements, such as a digital to analog converter (DAC), an up converter, a power amplification unit (PAU), a low noise amplifier (LNA), a down converter, and an analog to digital converter (ADC), which are used to provide service signals to a terminal within a service area and to process terminal signals received from the terminal within the service area.

Meanwhile, FIG. 2 illustrates the case where the queuing engine 221 of the MU 200 includes only the receiving buffer 221-2 and no transmitting buffer. However, when a plurality of MUs 200 are included in the DAS 1 and are connected to each other to transmit/receive the Ethernet data thereto/therefrom, the queuing engine 221 of the MU 200 may include the same or similar configuration as or to that of the queuing engine 421 of the RU 400 (described with reference to FIG. 4). In this case, this is because the MU 200 may operate in a similar way to that of the RU 400. In this case, a certain MU 200 among the plurality of MUs 200 may operate like a lower node or upper node to another MU 200.

Also, although not shown in an embodiment of the present invention, a queuing engine may be included in the HUB 300. The queuing engine included in the HUB 300 may include the same or similar configuration as or to that of the queuing engine 421 of the RU 400 (described with reference to FIG. 4).

In addition, when the RU 400 is set not to transmit NMS data (data received from the NMS) to the lower node, an element for transmitting the NMS data to the lower node may be omitted from the queuing engine 421 of the RU 400. In other words, in this case, the queuing engine 421 of the RU 400 may include no transmitting buffer 421-6 into which the Ethernet data is input from the MAC module 410, no transmitting scheduler 421-2, and no local buffer into which the Ethernet data is input from the lower node.

Also, the RU 400 may be designed in such a way that additional installation of an Ethernet port can be performed. In this case, a plurality of framers/SERDESs 423 corresponding to the lower nodes may be included in the queuing engine 421 of the RU 400. A plurality of local buffers 421-4 and/or receiving buffers 421-5 corresponding to the framer/SERDESs 423 may be included in the queuing engine 421 of the RU 400. Also, in this case, a plurality of framer/SERDESs 422 corresponding to the upper node may be included in the queuing engine 421 of the RU 400. A plurality of local buffers 421-4 and/or transmitting buffers 421-6 corresponding to the framer/SERDESs 422 may be included in the queuing engine 421 of the RU 400.

As described above, elements that constitute the DAS 1 according to an embodiment of the present invention may include different queuing engine configurations according to circumstances.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A node unit connected to a plurality of lower node units, comprising:
a media access control (MAC) module;
a plurality of framers; and
a queuing engine for supporting Ethernet communication between the MAC module and the plurality of framers that respectively correspond to the plurality of lower node units,
wherein the queuing engine multicasts first Ethernet data received from the MAC module to the plurality of framers, transfers second Ethernet data received from the plurality of framers to the MAC module,
wherein the plurality of framers format the first Ethernet data according to a format for digital transmission, and format a digital signal received from the plurality of lower node units according to a format of the second Ethernet data, and wherein the queuing engine comprises a buffer for buffering the second Ethernet data received from the plurality of framers, and outputting the buffered second Ethernet data to the MAC module.

2. The node unit of claim 1, wherein the queuing engine is implemented within a field programmable gate array (FPGA) that constitutes a digital part of the node unit.

3. The node unit of claim 1, wherein the buffer is a first-in first-out (FIFO) buffer.

4. The node unit of claim 3, wherein the FIFO buffer has a size of twice or more a full frame length of the second Ethernet data.

5. The node unit of claim 1, wherein at least one of the first Ethernet data and the second Ethernet data is control/management signals transmitted from an external management device connected to the node unit or transmitted to the external management device.

6. The node unit of claim 1, wherein the queuing engine further comprises a signal control logic for determining that the first Ethernet data received from the MAC module is effective and for dropping the first Ethernet data when the first Ethernet data is determined to be non-effective.

7. The node unit of claim 1, wherein the queuing engine further comprises a signal control logic for determining that the second Ethernet data received from the plurality of framers is effective and for dropping the second Ethernet data when the second Ethernet data is determined to be non-effective.

8. The node unit of claim 1, wherein the queuing engine further comprises a scheduler for determining whether at least one the first Ethernet data and the second Ethernet data is effective, and for outputting at least one of the first Ethernet data and the second Ethernet data determined to be effective.

9. The node unit of claim 8, wherein the scheduler determines that the first Ethernet data received from the MAC module is effective, and drops the first Ethernet data when the first Ethernet data is determined to be non-effective.

10. The node unit of claim 8, wherein the scheduler determines that the second Ethernet data received from the plurality of framers is effective and drops the second Ethernet data when the second Ethernet data is determined to be non-effective.

11. A node unit cascade-connected to an upper node unit and a lower node unit, comprising:
a media access control (MAC) module;
a first framer;
a second framer; and
a queuing engine for supporting Ethernet communication among the MAC module, the first framer corresponding to the upper node unit and the second framer corresponding to the lower node unit,
wherein the queuing engine multicasts third Ethernet data received from the first framer to the MAC module and the second framer, multicasts fourth Ethernet data received from the second framer to the MAC module and the first framer, multicasts fifth Ethernet data received from the MAC module to the first framer and the second framer,
wherein the first framer formats the fourth Ethernet data or the fifth Ethernet data according to a format for digital transmission, and formats a first digital signal received from the upper node unit according to a format of the third Ethernet data,
wherein the second framer formats the third Ethernet data or the fifth Ethernet data according to the format for digital transmission, and formats a second digital signal received from the lower node unit according to a format of the fourth Ethernet data, and
wherein the queuing engine comprises:
a first buffer for buffering the third Ethernet data received from the first framer or the fourth Ethernet data received from the second framer, and outputting the buffered third Ethernet data or the buffered fourth Ethernet data to the MAC module;
a second buffer for buffering the third Ethernet data received from the first framer or the fifth Ethernet data received from the MAC module, and outputting the buffered third Ethernet data or the buffered fifth Ethernet Data to the second framer; and
a third buffer for buffering the fourth Ethernet data received from the second framer or the fifth Ethernet data received from the MAC module, and outputting the buffered fourth Ethernet data or the buffered fifth Ethernet data to the first framer.

12. The node unit of claim 11, wherein the queuing engine is implemented within a field programmable gate array (FPGA) that constitutes a digital part of the node unit.

13. The node unit of claim 11, wherein at least one of the first buffer, the second buffer, and the third buffer is a first-in first-out (FIFO) buffer.

14. The node unit of claim 13, wherein the FIFO buffer has a size of twice or more a full frame length of at least one of the third Ethernet data, the fourth Ethernet data, and the fifth Ethernet data.

15. The node unit of claim 11, wherein at least one of the third Ethernet data, the fourth Ethernet data, and the fifth Ethernet data is control/management signals transmitted from an external management device connected to the node unit or transmitted to the external management device.

16. The node unit of claim 11, wherein the queuing engine further comprises a first scheduler for determining that the third Ethernet data input from the first buffer is effective, and outputting the third Ethernet data determined to be effective to the MAC module.

17. The node unit of claim 11, wherein the queuing engine further comprises a second scheduler for determining that the fourth Ethernet data input from the second buffer is effective, and outputting the fourth Ethernet data determined to be effective to the second framer.

18. The node unit of claim 11, wherein the queuing engine further comprises a third scheduler for determining whether the fifth Ethernet data input from the third buffer is effective, and outputting the fifth Ethernet data determined to be effective to the first framer.

* * * * *